(12) United States Patent
Epping

(10) Patent No.: US 11,278,150 B2
(45) Date of Patent: Mar. 22, 2022

(54) SYSTEM AND METHOD FOR RINSING

(71) Applicant: CUP&CINO KAFFEESYSTEM-VERTRIEB GMBH & CO. KG, Hövelhof (DE)

(72) Inventor: Frank Josef Paul Epping, Hövelhof (DE)

(73) Assignee: CUP&CINO KAFFEESYSTEM-VERTRIEB GMBH & CO. KG, Hovelhof (DE)

( * ) Notice: Subject to any disclaimer, the term of this patent is extended or adjusted under 35 U.S.C. 154(b) by 444 days.

(21) Appl. No.: 16/510,420

(22) Filed: Jul. 12, 2019

(65) Prior Publication Data

US 2020/0054163 A1 Feb. 20, 2020

(30) Foreign Application Priority Data

Aug. 16, 2018 (DE) .................................. 18189239.9

(51) Int. Cl.
*A47J 31/44* (2006.01)
*A47J 31/46* (2006.01)
*A47J 31/60* (2006.01)

(52) U.S. Cl.
CPC ....... *A47J 31/4485* (2013.01); *A47J 31/4496* (2013.01); *A47J 31/461* (2018.08); *A47J 31/60* (2013.01)

(58) Field of Classification Search
CPC .. A47J 31/4485; A47J 31/461; A47J 31/5253; A47J 31/469; A47J 31/4496; A47J 31/60

USPC ......... 99/275, 281, 286, 295, 300, 330, 403, 99/408, 472, 453, 493
See application file for complete search history.

(56) References Cited

U.S. PATENT DOCUMENTS 7,527,818 B2 5/2009 Dirren
2017/0290458 A1* 10/2017 Burrows ............. A47J 31/3628

FOREIGN PATENT DOCUMENTS

DE 102015117650 A1 4/2017
EP 3281569 A1 2/2018

* cited by examiner

*Primary Examiner* — Phuong T Nguyen
(74) *Attorney, Agent, or Firm* — WRB-IP LLP

(57) ABSTRACT

A device for preparation of a liquid such as milk with integrated rinsing system includes at least one reservoir for storing of the liquid, disposed in a cooling unit, a pump and a line system, which system includes a liquid suction line, via which the at least one reservoir is connectible to the pump, an outlet line, via which the pump is connectible to at least one outlet, and a rinsing line, via which the liquid suction line is loadable with a rinsing fluid, and an air volume controller, by which air, via an air supply line, is able to be led in a metered way to an inlet point into the liquid suction line, and a heating element designed as continuous-flow heater, which is disposed in the outlet line and is designed as thick film heater. The device has in the air supply line a second check valve and a first check valve, disposed between the air volume controller and inlet point into the liquid suction line, and the air supply line is connectible between first check valve and second check valve to the rinsing line via a valve.

13 Claims, 1 Drawing Sheet

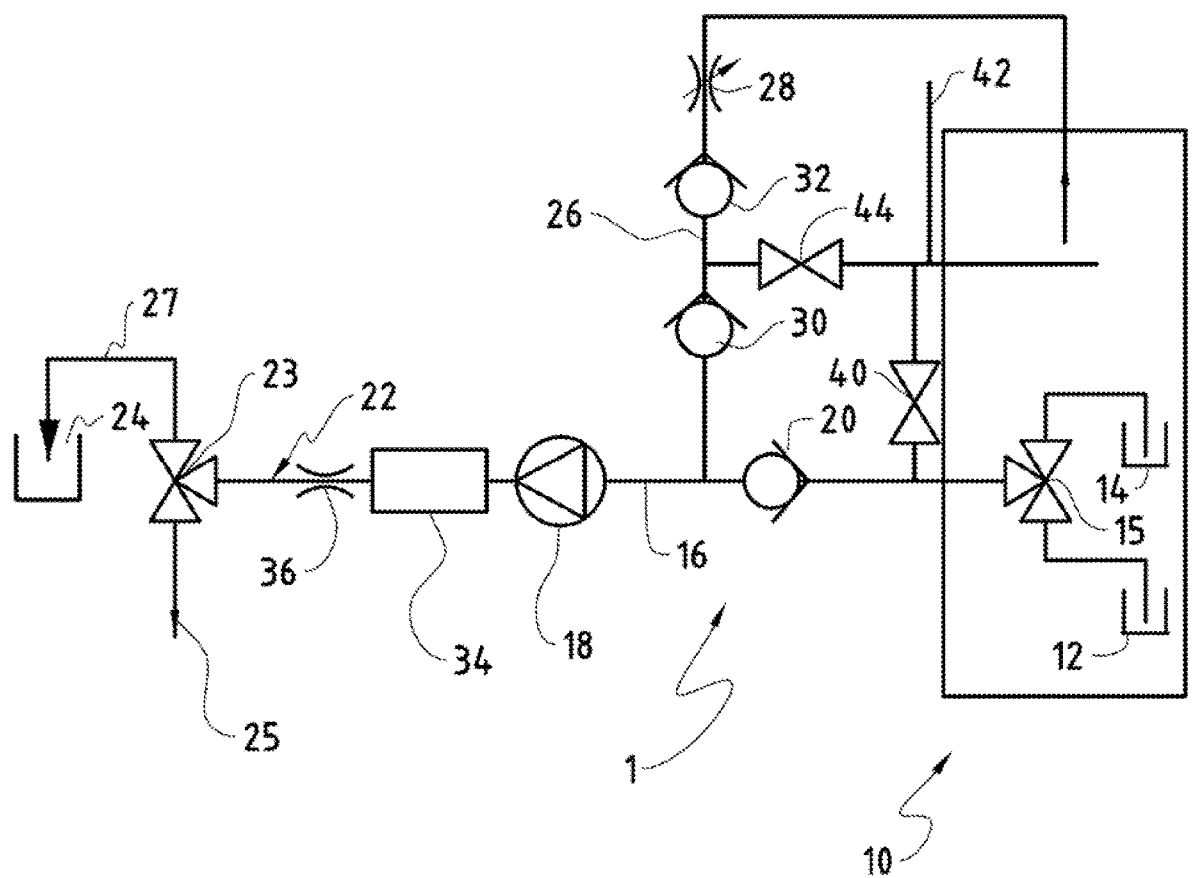

SYSTEM AND METHOD FOR RINSING

BACKGROUND AND SUMMARY

The present invention relates to a device for preparation of a liquid, in particular milk, with an integrated rinsing system, as well as a method for rinsing and/or cleaning of such a device. Understood by preparation is a frothing up and/or heating, so that selectively warm or cold milk foam or respectively warm or cold milk can be generated with the device.

Known for preparation of liquids, in particular liquid foodstuff milk, are so-called frothing or foaming devices which are used for heating and frothing up of milk during the preparation of hot beverages containing milk, such as e.g. cappuccino, lane macchiato, café lane, chocolate or chai. Basically milk is thereby mixed with air and/or steam.

Known from EP 1 593 330 is to suction milk by means of a pump out of a container via a milk suction line and to convey it to an outlet. During suctioning the milk is led through a continuous-flow heater and is heated, and air or respectively gas in a controllable quantity, via air supply line, is mixed with either the cold or the heated milk. Then the mixture is conveyed via a constriction point to the outlet via an outlet line. For metered air supply, it is known to dispose an adjustable air volume controller or also a fixed jet in the air supply line. The line system comprises various check valves, which prevent a return flow of the milk or respectively air or gas counter to a conveying direction. For rinsing or respectively cleaning, rinsing or respectively cleaning fluid is conveyed from a source via a rinsing valve via a line into the milk suction line by means of a pump.

Known from EP 3 281 569 is a modular foaming unit, whereby, besides a pump, a line system with a milk suction line and a single line for connection of the pump to an outlet nozzle, an outlet line, and an air enrichment element, this unit comprises a beating element designed as continuous-flow heater, designed as thick film heater. This modular foaming unit can be integrated as a module in a compact way and can be disposed as such in a cooling unit. The module is cleaned by means of a connected rinsing system, which rinses the foaming unit between outlet out of a cooling unit all the way to a manifold valve in the outlet line, via which the rinsing water is discharged.

Problematic with respect to the known foaming devices is that those line sections that are exposed to milk or frothed up milk, become clogged over time with dried up milk. Besides the functional disorder, these deposits can also lead to an adverse sensory effect owing to the curdled milk protein and a casein decomposition. But in particular for hygienic reasons it is necessary to rinse or respectively clean the milk-carrying pans of the device, preferably after each foaming, or respectively conveying, operation. Thereby desirable is a rinsing and/or cleaning operation that is as automated as possible, which leads to the desired reproducible cleaning result quickly, safely and independently of operating personnel. A distinction is made between rinsing, i.e. a rinsing out cyclically or after each dispensing, and cleaning, in particular rinsing with cleaning fluid, in particular at the end of a day.

Generally, for rinsing of known foaming devices, including the lines, rinsing fluid is introduced via a rinsing valve into a suction of the milk suction line and, via a further valve, after flowing through the elements belonging to the foaming device, but as a rule without the section to the outlet nozzle, is led into a collecting vessel or a drain. The section to the outlet nozzle is often rinsed only, periodically, for example every 10 minutes, depending upon the setting. This is problematic in particular since the discharge of rinsing fluid after this rinsing phase into a drip pan is visible to the customers. A section of the milk suction line, which extends between the rinsing valve and the milk container and in particular protrudes into the milk container from above, is cleaned less frequently, as a rule, in a special rinsing or respectively cleaning operation. This section is generally disposed in a cooled region and is consequently less affected hygienically.

Also to be considered, besides the previously mentioned aspects of a rinsing of foaming devices, is that, besides the temperature and characteristics of the milk such as fat content, pasteurization, pH value, protein content and storage period, the foam formation of milk is also dependent upon a precisely metered air supply. A precise and metered air supply is indispensable for a high and reproducible milk foam quality. However, in practice it has been shown that for a consistent milk foam consistency it is moreover essential that no residue from milk or milk foam and/or rinsing fluid and/or cleaning fluid dries inside the device including any provided valves, in particular in sections of the air supply, and brings about a negative effect with respect to a precise metering. In particular a completely cleaned air supply line is necessary for an exact air metering.

The significance of an exactly defined and pulsed air supply for milk foam production follows from DE 10 2015 117 650. Known is a device for heating and foaming of milk with a steam generator for generation of steam and a pressurized gas source for generation of pressure pulses of compressed gas, which, brought together, form a steam-gas mixture, which is introduced into the foaming liquid. Thus the characteristics of the formed foam should be able to be set in a flexible way by a user with respect to consistency, creaminess, porosity, foam thickness and foam stability. This configuration to achieve a defined and/or pulsed air injection is very complex and costly.

It is desirable to create for a device for preparation of liquid, in particular milk, a compact, robust and efficient device for selective preparation of cold or warm milk foam or of cold or warm milk, which is distinguished by a reproducible and high milk foam quality. Above and beyond this, the device and the corresponding method should be optimized with respect to the rinsing and cleaning effects.

The device according to an aspect of the invention for preparation of a liquid, in particular milk, with integrated rinsing system, comprises at least one reservoir for storing of the liquid, disposed in a cooling unit, a pump, a line system comprising a milk suction line, via which the at least one reservoir is connectible to the pump, an outlet line, via which the pump is connectible to at least one outlet, and a rinsing line, via which the milk suction line is loadable with a rinsing fluid, an air volume controller, by means of which air, via an air supply line, is able to be led in a metered way to an inlet point into the milk suction line, and a heating element designed as continuous-flow heater, which is disposed in the outlet line and is designed as thick film heater. Thereby disposed in the air supply line between air volume controller and inlet point into the milk suction line is a second check valve and a first check valve, and the air supply line is connectible between first check valve and second check valve to the rinsing line via a valve.

In an aspect of the invention, provided in the air supply line is the air volume controller for metered air supply and the first and second check valve, whereby the air volume controller can be designed as proportional valve. The mentioned valve for connecting of the air supply line to the rinsing system is disposed between first and second check valve. The first check valve opens or closes that section between the said valve and the air supply line in direction of introduction point and the second check valve opens or closes that section between the said valve and the air supply line in direction of air volume controller. First and second check valves are preferably switchable independently of one another.

It has been shown that a defined opening of two serially arranged check valves in a line system is hardly possible without pulsation occurring in the system. In particular with milk conveyance, negative consequences thus arise for the milk foam quality to be achieved. Therefore it is necessary to design first and second check valves in the air supply line in such a way that they are able to take an open or closed position in a way harmonized with one another. A third check valve in the milk suction line is thereby also to be considered, which is able to prevent a back flow of suctioned milk counter to a conveying direction.

Check valves are often designed as spring-loaded check valves, which allow a flow in one direction. The mechanism of spring-loaded check valves comprises a closing element, which is pressed tightly in a correspondingly shaped seat by means of a spring force of a return spring. If a counteracting force acting upon the closing element exceeds the spring force of the return spring, the passage is opened. The opening pressure is adjustable, for example via the spring force of the return spring. With the device according to the invention for preparation of liquid with an integrated rinsing system, the opening pressure is determined in a definitive way by the negative pressure on the suction side of the pump. If the generated negative pressure on the suction side is not sufficient, the first and second check valves in the air supply line do not open or open incompletely. If the negative pressure on the suction side is sufficiently great to open the corresponding check valves in the air supply line, vibrations on the check valves can occur, so that an exactly metered air supply is not possible. Furthermore, in particular the mode of operation of spring-loaded check valves is especially susceptible to soiling caused by incoming milk and/or milk foam.

In a preferred embodiment of an aspect of the invention, the first check valve disposed in the air supply line of the device according to the invention and the second check valve are designed as directly closing check valves. The mechanism of such check valves comprises a closing element which is pressed into the seat by the force of gravity acting upon the closing element and/or by a medium and thus closes tightly. So that directly closing check valves are able to be disposed at least in the air supply line, it is foreseen that the air supply line in the device according to the invention for preparation of liquid is disposed in a vertical orientation. Accordingly the air volume controller and second and first check valves included in the air supply system are disposed vertically from above to below in the air supply line. With a supply of air, this vertical orientation releases the corresponding check valves, so that these valves open completely and a precisely metered air supply is possible without fluctuations. With this configuration, at most only the first non-return valve is possibly in contact with milk or respectively milk foam, but is also regularly rinsed at least from one side, in particular when the milk suction line is rinsed. The milk suction line can be disposed laterally, i.e. substantially horizontally, in the device so that milk is suctioned in horizontal direction via the milk suction line.

In another embodiment of the device according to an aspect the invention for preparation of liquid with an integrated rinsing system, it is foreseen that the air for foaming the milk is supplied in a metered way with a constant temperature via the air volume controller. Preferably this is air of low temperature, which is especially suitable for production of a repeatable high milk foam quality. Preferably air is obtained from the cooling unit, in which the milk is stored in a cooled way. It is also possible that the device according to the invention is completely accommodated to a large extent in the cooling unit as modular foaming unit. A supplied cooled air prevents temperature-related fluctuations in the quality of the milk foam. The milk foam quality is independent of seasonally fluctuating ambient temperatures and is thus of consistently high quality.

Furthermore it is foreseen that a restrictor is disposed downstream of the pump in the outlet line, whereby disposed in this device is a manifold valve, which connects the outlet line selectively to a nozzle for discharge of rinsing fluid and, via a line, to the outlet at which the prepared liquid can be dispensed. In particular the line between manifold valve and outlet is dimensioned in such a way that it has only a small filling volume, preferably between 2 ml and 3 ml.

Above and beyond this, by means of a rinsing, valve, the milk suction line is connectible outside the cooling unit to the integrated rinsing system. During a rinsing operation, preferably carried out between two actions of dispensing of prepared milk, the lines and elements directly exposed to milk or respectively milk foam in those areas outside the cooling unit and also the air supply line are at least partially rinsed and cleaned. This is necessary above all since during a frothing up of milk, especially at high temperatures, the milk foam can expand also in direction of the air supply line, so that changed conditions arise in this air supply line which interfere with an exactly metered air supply. Furthermore a check valve disposed in the air supply line and in contact with milk or respectively milk foam can be prevented in an advantageous way from being soiled and adversely affected in its functional capability.

The mentioned valve, via which the air supply line can be connected to the rinsing system and can be loaded by rinsing and/or cleaning fluid, is disposed at a considerable distance from the introduction point of the air supply line into the milk suction line, so that it can be ensured that the section of the air supply line in which milk foam could penetrate is rinsed by the rinsing fluid. Preferably the valve is disposed at a higher level with respect to the introduction point, so that the rinsing fluid flows by gravity into the sections to be cleaned.

The integrated rinsing system can use as rinsing and/or cleaning fluid any medium in fluid form that is suitable to clean thoroughly the elements coming into contact with milk or respectively milk foam, including the air supply line. Alternatively a cleaning or respectively rinsing with a gaseous medium is also conceivable. Especially suitable is a rinsing with cold or heated water or a solution with chemical additive and further rinsings. Besides a drying with opened air inlet and activated pump, steam or compressed air can also be used in order to achieve a complete drying of the elements and lines.

A method according to an aspect of the invention for rinsing of the device for preparation of liquid, in particular milk, with an integrated rinsing system foresees that, for a rinsing operation, a rinsing fluid can be supplied via a rinsing line, whereby the rinsing fluid is conveyed to the heating element designed as continuous-flow heater, in particular as thick film heater, at least partially via the milk suction line of the pump and to the outlet line, whereby rinsing fluid is also conducted to the air supply line via a valve and this air supply line is rinsed.

The triggering of a cleaning or respectively rinsing operation can take place via a time control, whereby after each dispensing of prepared milk to the outlet or after a predetermined number of dispensing actions a rinsing is activated automatically. The rinsing operation can be controlled by means of a control system whereby sensors are disposed which capture data with respect to a filling of the system and with respect to the type of filling and transmit them to the control system. Assigned to the rinsing system is the rinsing valve in the milk suction line and the said valve in the air supply line, which can be selectively switched, on the one hand in order to conduct the rinsing fluid via the milk suction line from a cooling unit, and, on the other hand, the rinsing fluid via the air supply line. A simultaneous rinsing is likewise possible. The rinsing is also possible in reverse direction. With a rinsing after each dispensing of prepared milk, rinsing fluid is located in the device according to the invention at the start of the milk foam preparation. The device according to the invention is thereby filled with rinsing fluid, preferably water, from the outlet, i.e. it a section between manifold valve and outlet or respectively outlet nozzle for milk or respectively milk form up to the border to the cooled region. With closed manifold valve, the water remains in the section between this valve and the outlet and blocks this for subsequent running of e.g. milk or milk foam. For discharge of the rinsing fluid, the manifold valve provided in the outlet line opens and the water or respectively rinsing fluid can be led out into a container or a nozzle. At the same time the pump is started and the air volume controller is opened. At the point in e when the suctioned milk or respectively milk foam reaches the manifold valve, this can be detected via correspondingly placed sensors, or respectively with a time delay, this valve is switched in such a way that prepared milk or respectively milk foam is conducted to the outlet. Water which was present in the section between manifold valve and outlet is likewise pressed in outlet direction. However this quantity is so minimal that the water does not represent any adverse effect for the milk or respectively milk foam for the beverage to be produced. If the end of the dispensing of prepared milk is detected, the said valve opens, via which the air supply line is connectible to the rinsing system and rinsing fluid is supplied. Owing to the pressure of the supplied rinsing fluid, the first check valve opens and the second check valve closes the section in air volume controller direction and the third check valve closes the milk suction line, whereby the suction pressure of the pump is compensated. Preferably the rinsing fluid, has a pressure of at least 1, preferably 2 bar. With a time delay, preferably in the range of about 0.5 sec, the air volume controller is brought into closing position. If the rinsing fluid reaches the manifold valve, this valve opens, in order to discharge the rinsing fluid. With the rinsing or respectively cleaning operation, the components of the device according to the invention between manifold valve on the outlet side and the said valve are rinsed. Alternatively the section between manifold valve and outlet can be rinsed cyclically.

Used advantageously with the device according to the invention with integrated rinsing system can be the heating element designed as thick film heater. Since between two milk or respectively milk foam dispensing actions the thick film heater conceived as continuous-flow heater is filled with rinsing fluid, e.g. water, this water can be heated up with high energy without the subsequently flowing milk foam being influenced. Thus short heating up periods result.

BRIEF DESCRIPTION OF THE DRAWINGS

An embodiment example of the invention will be explained more closely in the following with reference to the drawing.

FIG. 1 shows schematically a device according to the invention for preparation of a liquid foodstuff in particular milk, with an integrated rinsing system.

DETAILED DESCRIPTION

The device 1 according to the invention shown in FIG. 1 for preparation of a liquid, in particular milk, comprises milk of one typo stored in a first reservoir 12 and in a second reservoir 14 milk of another type or respectively milk substitute. The first and second reservoirs 12, 14 are connected in the embodiment example shown with a suction side of a pump 18 via a 3/2 directional control valve 15 to a milk suction line 16, so that milk or respectively milk substitute can be taken out of the first and/or second reservoir 12, 14. Disposed in the milk suction line 16 is a check valve, designated as third check valve 20, which opens in direction of the pump 18. The pump 18 is connected on its pressure side via a single outlet line 22 to an outlet 24, at which prepared milk or respectively milk foam can be delivered. Disposed in the outlet line 22 before the outlet 24 is a manifold valve 23, so that selectively flow is opened in direction of outlet 24, via a line 27, or flow is opened in direction of a nozzle 25.

Coming out on the suction side of the pump 18 into the milk suction line 16 is an air supply line 26, in which an air volume controller 28 is provided. The air volume controller 28 can be designed as proportional valve, so that air is supplied in a precisely metered way from the environment. In particular the air can be obtained from a cooling unit 10 and thus has a constant temperature independent of the ambient temperature. The milk can be mixed with a metered amount of air via the air supply line 26, whereby a milk/air mixture is formed which is suctioned by the pump 18. Disposed in the air supply line 26 are first and second check valves 30, 32, which will still be described more precisely.

Disposed on the pressure side of the pump 18 is on the outlet line 22 a heating element 34 designed as continuous-flow heater. The heating element 34 is designed as thick film heater, an electrical heating resistor being installed on the heating element 34 on a support, on which a flow pathway is provided. During flow along the flow pathway, with activated heating element 34, the liquid, i.e. milk or a milk/air mixture, is brought to a predetermined temperature, which can be controlled by means of a temperature sensor (not shown). With switched-on heating element 34, warm or hot milk and/or milk foam can be produced; with switched-off heating element 34 cold milk or milk foam can be conducted to the outlet 24. This is possible in particular by means of the thick film heater with its quick reaction time and a minimal waste heat.

Disposed furthermore <in> FIG. 1 in the outlet line 22 downstream from the heating element 34 is a restrictor 36, which produces from the already present, possibly heated, milk/air mixture a stable and homogeneous milk foam. The restrictor 36 can be designed as jet, baffle, fixed or adjustable nozzle, whereby a narrowing of the through flow cross sectional area is provided at a restriction point. In particular the restrictor 36 can be designed as a throttle adjustable by a control unit (not shown) or another device. The restrictor 36 produces a counter pressure, which also makes itself noticeable in the flow pathway included in the heating element 34. Counteracted accordingly is an increasing expansion, tending to result with higher temperature, and thus air bubbles growing larger in the milk foam. Smaller air bubbles in a milk/air mixture facilitate the heating of this mixture, which, otherwise is negatively influenced by air as poor thermal conductor.

An adjustable restrictor 36, as well as a precisely metered air quantity and the adjustable temperature, makes possible an optimal mixing of air and milk into a milk/air mixture and a dispersion of small air bubbles in the mixture, which stand for a high foam quality.

The device 1 for preparation of liquid can be integrated into a housing as a module, which is able to be incorporated in the cooing unit 10. Virtually all components of the device 1 according to the invention can be incorporated in the cooling unit 10, whereby the cooling unit 10 can be designed as an add-on device to a coffee machine or also as an integrated component of a coffee machine.

The device 1 according to the invention comprises furthermore an integrated rinsing system for rinsing or respectively cleaning of the elements included in the device 1 according to the invention. By means of a rinsing valve 40, the milk suction line 16 is connectible to the rinsing system, in particular connectible to a rinsing line 42. Hence the milk-conducting elements, for example the milk suction line 16, the pump 18, the heating element 34, the restrictor 36 and the outlet line 22 including the line 27 all the way to the outlet 24 and the outlet 24 itself are able to be loaded with the rinsing fluid, whereby upon opening of the rinsing valve 40 the third check valve 20 unblocks the milk suction line 16. The third check valve 20 can thereby open at a pressure of the rinsing fluid of at least 1 bar. In contrast to known cleaning or respectively rinsing systems for devices for production of film foam, it is provided for, according to the invention, with the integrated rinsing system, that also the cooled regions are sufficiently rinsed in which the development of lactic acid and casein is only minimal owing to the low temperatures.

Now significant is that with the integrated rinsing system according to the invention also the air supply line 26 is rinsed. For this purpose, this line is connectible via a valve 44 to the rinsing line 42 and thereby to a source of rinsing fluid. Accordingly there exists the possibility to rinse or respectively clean at any time not only the line sections exposed to milk, but also the air supply line 26. The rinsing line 42 has a section in which the valve 44 is disposed, and which comes out in the air supply line 26 between the first check valve 30 and the second check valve 32. During the loading of the rinsing line 42 with rinsing fluid, the second check valve 32 is in closure position, while the first check valve 30 is opened.

As is shown in FIG. 1, it is of particular significance that the air supply line 26 with the air volume controller 28, the second check valve 32 and the first check valve 30 are oriented in a vertical configuration it is thereby possible to design the first and the second check valves 30, 32 as directly closing check valves, which, through the vertical alignment with respect to the air supply, are released by the force of gravity acting upon a closing element. Accordingly a rinsing or respectively cleaning of the air supply line 26 is then also possible when the negative pressure generated by the pump 18 in the air supply line 26 alone would not be sufficient to open the first check valve 30.

In summary, the device 1 according to the invention for preparation of liquid, in particular milk, with integrated rinsing system has the advantage that, through rinsing or respectively cleaning of the air supply line 26 and through the vertical configuration of directly closing check valves 30, 32 in the air supply line 26, an improvement of the hygienic and sensory conditions can be achieved and the air supply can be supplied in a precisely metered way. This is achieved without additional time and effort since the air supply line 26 can be rinsed and cleaned in the same rinsing cycle as the elements exposed to milk.

The invention claimed is:

1. A device for preparation of a liquid with integrated rinsing system, comprising
at least one reservoir for storing of the liquid, disposed in a cooling unit;
a pump;
a line system, comprising
a liquid suction line, via which the at least one reservoir is connectible to the pump,
an outlet line, via which the pump is connectible to at least one outlet,
a rinsing line, via which the liquid suction line is loadable with a rinsing fluid,
an air volume controller, by means of which air, via an air supply line, is able to be led in a metered way to an inlet point into the liquid suction line, and
a heating element designed as continuous-flow heater, which is disposed in the outlet line and is designed as thick film heater,
wherein disposed in the air supply line between air volume controller and inlet point into the liquid suction line are a second check valve and a first check valve, and the air supply line is connectible between first check valve and second check valve to the rinsing line via a valve.

2. The device according to claim 1, wherein the first check valve and the second check valve are designed as directly closing check valves.

3. The device according to claim 1, wherein the air volume controller included in the air supply line, the second check valve and the first check valve are positioned above one another in a vertical configuration.

4. The device according to claim 1, wherein the air volume controller is set up to supply air out of the cooling unit in a metered way.

5. The device according to claim 1, wherein the rinsing line is connectible to the liquid suction line outside the cooling unit via a rinsing valve.

6. The device according to claim 1, wherein disposed in the outlet line downstream from the pump is a restrictor.

7. The device according to claim 1, wherein disposed in the outlet line is a manifold valve, which selectively connects the outlet line to a nozzle for discharging rinsing fluid and the outlet at which prepared liquid can be dispensed.

8. The device according to claim 1, wherein a line between manifold valve and outlet has a filling volume of 2 ml to 3 ml.

9. A method for rinsing a device for preparation of liquid with an integrated rinsing system, the device comprising
at least one reservoir for storing of the liquid, disposed in a cooling unit;
a pump;
a line system, comprising
a liquid suction line, via which the at least one reservoir is connectible to the pump, an outlet line, via which the pump is connectible to at least one outlet, and a rinsing line, via which the liquid suction line is loadable with a rinsing fluid, an air volume controller, by means of which air, via an air supply line, is able to be led in a metered way to an inlet point into the liquid suction line, and a heating element designed as continuousflow heater, which is disposed in the outlet line and is designed as thick film heater, wherein disposed in the air supply line between air volume controller and inlet point into the liquid suction line are a second check valve and a first check valve, and the air supply line is connectible between first check valve and second check valve to the rinsing line via a valve, the method comprising supplying, for a rinsing operation via a rinsing line, a rinsing fluid, the rinsing fluid being led at least partially via the liquid suction line of the pump, the heating element designed as continuous-flow heater and the outlet line, whereby also the air supply line is supplied and rinsed with rinsing fluid via a valve.

10. The method according to claim 9, wherein a rinsing operation takes place after each dispensing of prepared liquid all the way to, and including, the outlet.

11. The method according to claim 9, wherein during a rinsing operation the liquid suction line, the air supply line and the outlet line are rinsed at the same time at least partially.

12. The method according to claim 9, wherein during a rinsing operation the manifold valve in the outlet line is opened at least partially in such a way that the outlet line and the line all the way to the outlet is filled with rinsing fluid.

13. The method according to claim 9, wherein before each dispensing of prepared liquid at the outlet the device from the rinsing valve and the valve all the way to the outlet is filled with rinsing fluid, whereby at the start of a dispensing the manifold valve is opened in order to conduct the rinsing fluid out of the device via the nozzle and is then closed when the prepared liquid reaches the manifold valve.

* * * * *